March 23, 1971  R. E. PERRY  3,572,224
LOAD SUPPORTING PLANK SYSTEM
Filed Oct. 14, 1968  5 Sheets-Sheet 2

ROBERT E. PERRY
INVENTOR.

BY John S. Rhoades

ATTORNEY

March 23, 1971  R. E. PERRY  3,572,224
LOAD SUPPORTING PLANK SYSTEM
Filed Oct. 14, 1968  5 Sheets-Sheet 5

FIG_5

FIG_6

FIG_6A

ROBERT E. PERRY
INVENTOR.

BY John S. Rhoades
ATTORNEY

March 23, 1971 R. E. PERRY 3,572,224
LOAD SUPPORTING PLANK SYSTEM
Filed Oct. 14, 1968 5 Sheets-Sheet 4

FIG_9

FIG_10

ROBERT E. PERRY
INVENTOR.

BY John S. Rhoades
ATTORNEY

March 23, 1971 R. E. PERRY 3,572,224
LOAD SUPPORTING PLANK SYSTEM
Filed Oct. 14, 1968 5 Sheets-Sheet 5

FIG_7

FIG_8

FIG_7A

ROBERT E. PERRY
INVENTOR.

BY John S. Rhoades
ATTORNEY

United States Patent Office 3,572,224
Patented Mar. 23, 1971

3,572,224
LOAD SUPPORTING PLANK SYSTEM
Robert E. Perry, Lafayette, Calif., assignor to Kaiser Aluminum & Chemical Corporation, Oakland, Calif.
Filed Oct. 14, 1968, Ser. No. 767,447
Int. Cl. E01c 5/00
U.S. Cl. 94—13                                    18 Claims

ABSTRACT OF THE DISCLOSURE

This invention relates to an improved load supporting plank system comprised of a series of removably interlocked planks wherein the joints formed by the various marginal edges of the interlocked planks are provided with unique locking and sealing means to prevent the penetration of water and the like through the said joints and facilitate the installation of the system.

DESCRIPTION OF THE INVENTION

This invention relates to a novel load supporting plank system that is particularly adapted for use in a landing mat installation wherein improved means are provided for locking and sealing the individual planks to each other so that the mat sections can be easily emplaced and removed and water penetration at the joints effectively inhibited. In prior art landing mat systems, such as those represented by U.S. Pats. 3,172,508, 3,301,147, 3,348,459 and 3,385,-183, serious problems were involved in the initial installation, use and overall maintenance of these systems.

For example, because of the particular way in which the individual mat components of these systems were joined together, an inordinately large number of undamaged mat sections or components had to be removed in order to gain access to a given mat section or sections damaged by enemy bombing or mortar fire, etc. for the purposes of repairing or replacing these damaged sections. The joint structures which were employed in these mat systems were also such that when it rained, water penetrated the cracks or openings in the joints and settled in pockets under the mat sections or planks. As a consequence, when water penetrated through the matting the loads applied to the matting by aircraft passing across the same created a hydraulic or pumping action that forced soil out from under the matting and through the matting joints thereby leaving sink holes or depressions underneath the matting adjacent the joint structure. Because of this soil erosion and pump-through action whenever it rained, these sink holes got progressively larger and allowed more water to collect in the same and more soil to be pumped through the joints due to air traffic until, in a relatively short time, the landing mat system became unfit for use until the matting was disassembled and all of the sink holes had filled with earth or the like.

This problem of preventing water from penetrating through the surface of the matting to the subsoil has been further complicated by the requirement that the marginal edges of the matting panels or planks be of such design that they could be readily and easily emplaced, have the ability to effectively transfer loads from one to the other while, at the same time, be securely but loosely locked together to allow for normal expected thermal expansion and contraction at the installation site. In the past, in the design of landing mat sections emphasis was placed primarily on load transfer, ready interlockability and installation features with minimal or no attention being given to effectively sealing such matting against water penetration and of obtaining minimal disturbance of the overall matting during repair of a given damaged mat section.

The aforesaid problems of disturbing substantial areas of the overall matting system during replacement or repair of individual mat sections and of water penetration have been substantially eliminated by the improved matting planks of the instant invention and the locking arrangements used in joining individual planks together. These same matting planks are also of a design which provides for efficient load transfer from plank to plank across the joints between individual planks and for improved interlocking of one matting plank with adjacent and surrounding planks.

SUMMARY OF THE INVENTION

This invention, in general, relates to improved joint structures for the planks or modules in a load supporting modular plank system that can be used in demountable landing mat installations and the like. These joint structures include an improved locking bar arrangement for locking certain opposed marginal edges of a pair of planks along with an improved means such as an inflatable tube for sealing the aforesaid opposed plank edges together. Other marginal edges of the aforesaid planks can be of a roll-in type for ease of assembly and disassembly. An improved compression joint sealing means can be used to prevent penetration of water through the joints formed by the latter plank edges. Finally, an improved water sealing arrangement is employed at the intersection of a plurality of plank corners to provide for a substantially fully sealed landing mat system.

BRIEF DESCRIPTION OF DRAWINGS

The various advantageous features of the instant invention will be further understood and appreciated by reference to the following drawings wherein:

FIG. 4A is a fragmentary perspective view of several planks and illustrates how the improved roll-in locking bar of the instant invention can be rolled into place in one panel or plank edge and then shifted or slid endwise into another adjacent plank;

DETAILED DESCRIPTION

Figure 1:
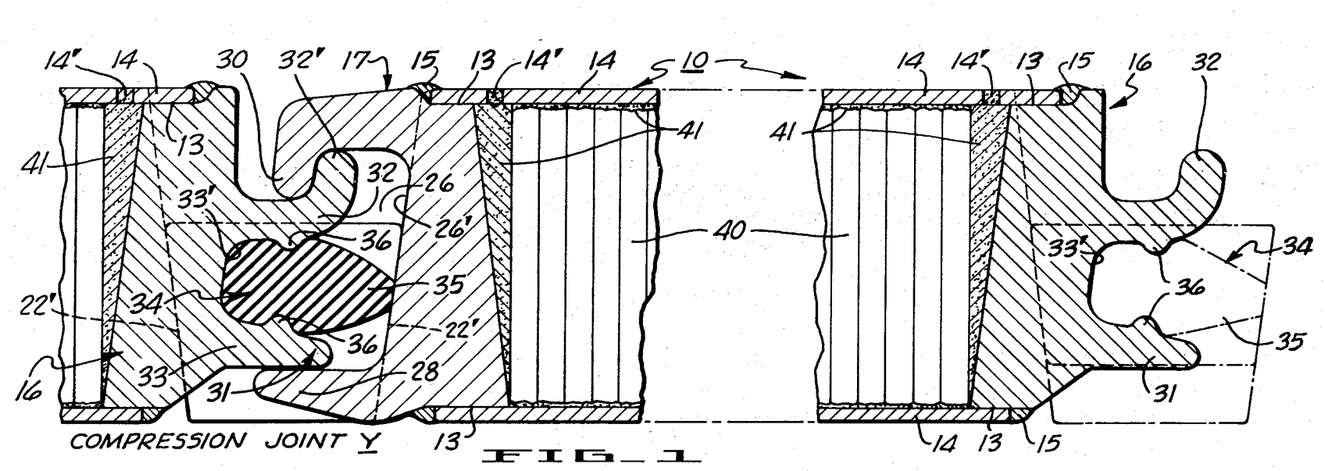
FIG. 1 is a broken cross-sectional view of a typical pair of planks which can be used in practicing the instant invention with certain of the opposing marginal edges thereof making up what can be referred to as a compression joint being shown in detail.
Figure 2:
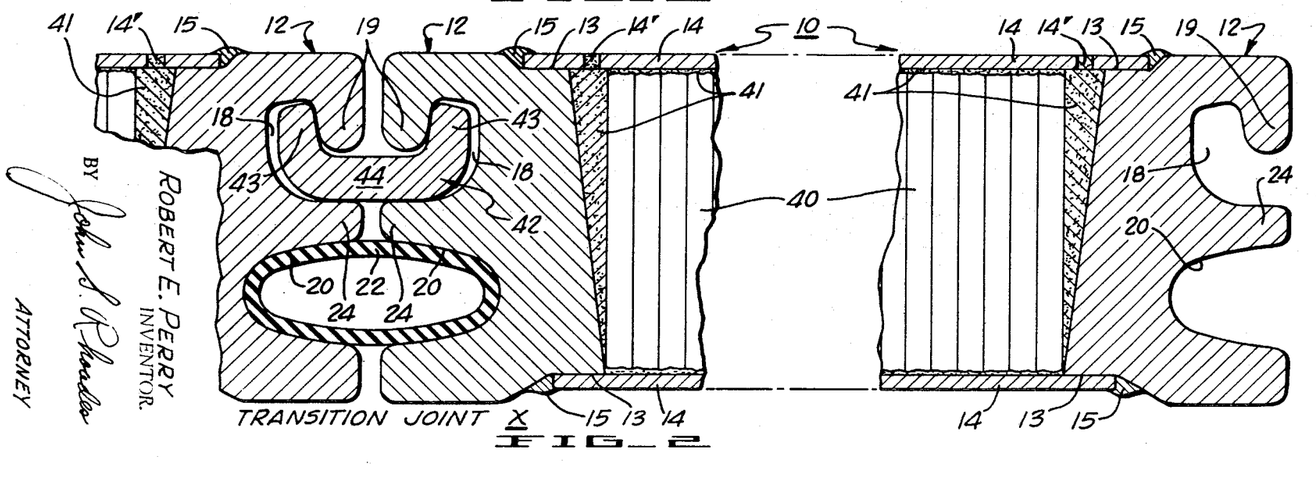
FIG. 2 is a further broken cross-sectional view of a typical pair of modular planks that can be used in practicing the instant invention with certain opposing marginal edges thereof making up what can be referred to as a transition joint being shown in detail.

With further reference to the drawings, the particular improved locking bar and plank joint sealing arrangements of the instant invention can be used with load bearing modular planks that comprise fully extruded aluminum or aluminum alloy sections of the type shown in U.S. Pat. 3,301,147 and in FIG. 4A of the drawings or a modular plank of the type shown in FIGS. 1 and 2. In general, in the case of the plank of FIGS. 1 and 2, the various marginal edges of the plank can comprise roll formed elements or light metal extrusions appropriately secured together. Metal sheets are secured to these extrusions to form a top and bottom for the plank and a honeycomb core element is located or disposed therebetween. The invention will be particularly described with reference to the latter type of load bearing plank provided with a core element.

The modular plank shown in the various drawings is generally comprised of a many sided plank 10 and it is preferably either of a square or rectangular configuration. When a series of these modular planks are interlocked together, they can form a landing mat installation of the type illustrated in FIGS. 6 and 6A. Although the planks can be arranged in the chevron fashion of FIG. 6 such that they are fully staggered relationship with respect to one another along each of their marginal edges, they can also be disposed in the arrangement illustrated in FIG. 6A. In this latter arrangement, the planks are so arranged relative to one another that the edges of the planks which carry the locking bar will be substantially linearly arranged along parallel locking bar joint lines while being generally disposed crossways or at an angle to the normal flight pattern or direction of travel of an aircraft using the landing mat installation.

As indicated in the drawings, the individual modular planks 10 include a plurality of marginal light metal extruded or roll formed elements. Two of these extruded connector elements identified by the reference numeral 12 are identical in configuration and they are used on two opposing edges of the plank 10. Thus, a description of one such element will suffice for both. This extruded element 12 is provided at the top and bottom thereof with stepped portions 13 for receiving the top and bottom metal facings 14 of aluminum or the like. Suitable epoxy resinous materials or aluminum fillet weld materials 15 can be used to secure the aluminum sheets or facings 14 to the elements 12.

Connector element 12 is further provided with an inwardly and upwardly directed or roughly elbow shaped tongue receiving groove 18 in one portion thereof such as the upper reaches thereof and partially formed by depending lip 19. The various surfaces of element 12 defining this groove are curvilinear and preferably of generous radii. Another portion of element 12 such as the lower reaches thereof is provided with a further inwardly directed arcuate recess or groove 20 that can be semi-elliptical for receiving an inflatable tube or tube-like joint sealing element 22 of resilient rubber or rubber-like material. Recesses or grooves 18 and 20 are separated from each other by means of the rib 24 and portions of the exposed surfaces of rib 24 act to define the grooves 18 and 20.

Figure 5:
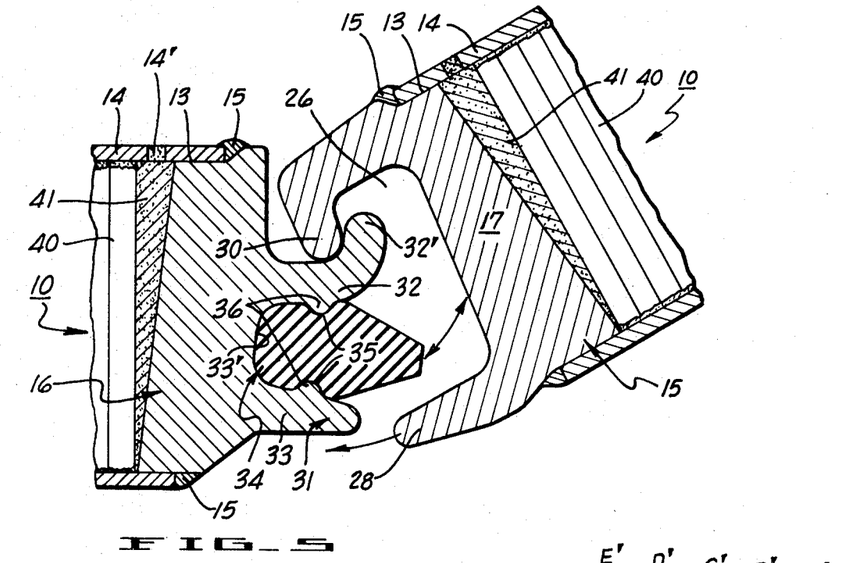
FIG. 5 illustrates how the plank edges shown in FIG. 1 can be rolled into position to form a compression joint.

The other two opposing edges of the quadrilateral plank 10 can likewise be formed from aluminum extrusions or roll formed sections 16 and 17. When made in the form of extrusions, extruded member 17, which can be considered as a female member or connector, is generally provided with a channel-like opening or mouth 26 bounded by a lower shelf portion 28 and an opposing turned in finger portion 30. The male member or connector 16 which is adapted to be removably inserted in roll-in fashion in the mouth 26 of the female connector 17 is as indicated in FIGS. 1 and 5 generally provided with a bifurcated or forked tongue section 31 that includes an upper prong 32 having an upturned finger portion 32' which is interengageable with the in-turned finger portion 30 on the female member 17 of an opposing plank, a lower prong 33 that is adapted to slide over and rest on shelf 28 of connector 16 and an opening 33' within which a resilient elongated gasket-like element or joint sealing strip 34 is adapted to be lodged. The main portion of this sealing strip or elongated plug can be somewhat arrow-shaped in cross-section whereby it has a slightly grooved waist 35 which is adapted to be engaged by the teeth or splines 36 of the male connector when the strip or elongated plug 34 is inserted in the groove or opening 33' of the male connector 16.

Figure 3:
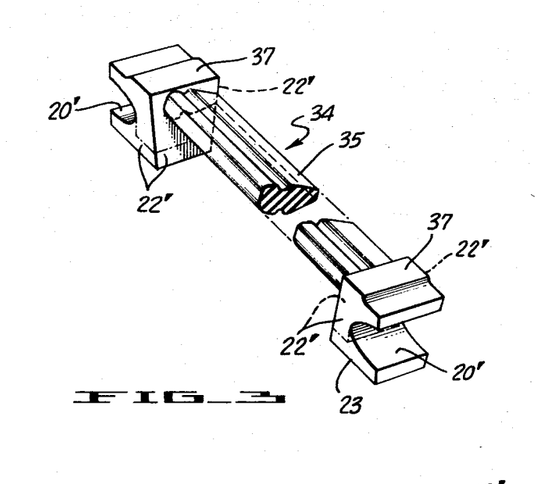
FIG. 3 is a broken perspective view of a suitable compression sealing strip that can be used in the various joint structures formed by the edges of the planks shown particularly in FIG. 1.

Plug 34 is as indicated in FIG. 3 advantageously provided with integrally molded and enlarged end sections or heads 37 which are also grooved. The functions of these grooved heads will be described more fully hereinafter.

Although one tooth element 36 or other suitable means can be used to hold the sealing plug 34 in opening 33', the use of two such tooth elements disposed in opposed relationship is preferred. Members 16 and 17 are each provided with appropriate stepped portions 13 as in the case of members 12 for receiving the upper and lower deck facings or plates 14 which are also affixed to members 16 and 17 by the fillet weldments 15. After the various extruded members 12, 16 and 17 have been suitably welded togeher at their adjoining ends in the areas H of FIGS. 7 and 7A in a manner well known in the art and to the bottom plate 14 and prior to application of top plate 14, a honeycomb core structure 40 of aluminum foil or the like is disposed within the pan formed by bottom plate 14 and extruded side elements 12, 16 and 17. The core 40 is then anchored to bottom plate 14 and sides 12, 16 and 17 by suitable epoxy resinous material 41. Similar resinous materials can be used to anchor the core 40 to top plate 14. Thereafter, top plate 14 is attached to side elements 12, 16 and 17 by weld beads 15 in the same fashion as bottom plate 14 is anchored to the said side members. Holes 14' in upper plates 14 can be used to inject the resinous materials into the interior of the planks, if desired.

In the case of the ultimate transition type joint structure formed by opposing grooved connector elements 12 on adjacent planks 10, when the planks are brought together, a locking bar 42 is advantageously employed in forming this joint structure. This bar acts to efficiently transfer loads from one plank to another plank. This locking bar 42 is generally U-shaped so as to be provided with tongues or flanges 43 and a web 44. The flanges 43 are preferably of arcuate shape and generous radii. They are dimensioned so as to be as freely slidable linearly or endwise within and along the grooves or recesses 18 in the elements 12 when the planks 10 are placed edge to edge such that the recesses 18 of connector elements 12 of the opposed planks are aligned.

Figure 4:
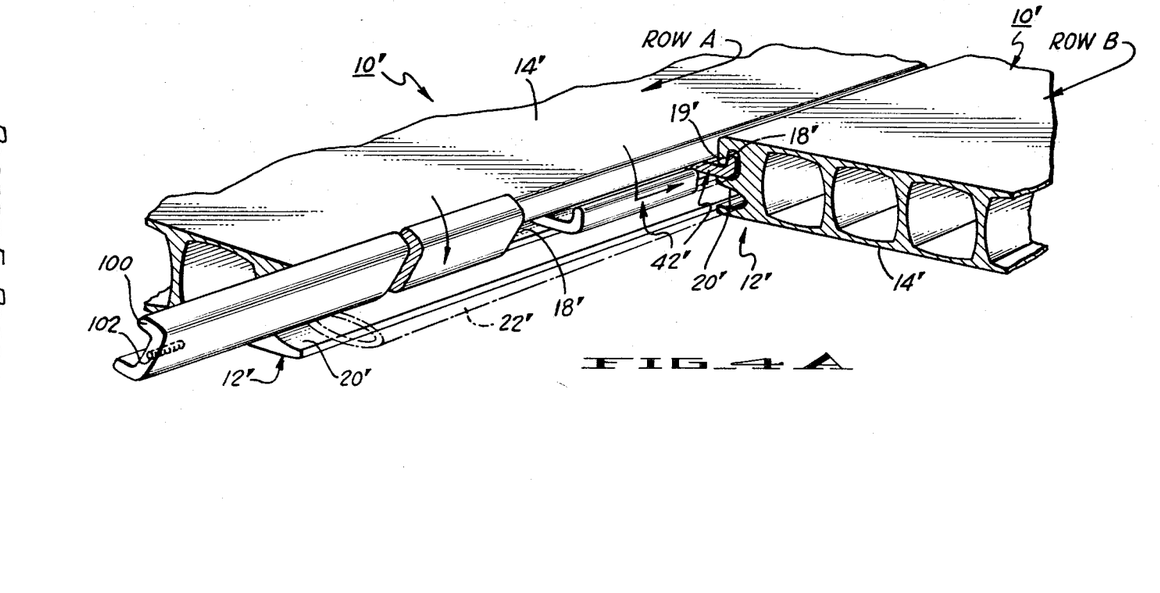
FIG. 4 is a partial sectional view of one of the edges of a plank and indicates how an improved roll-in locking bar can be used in the joint structure formed by such an edge in two adjacent and opposed planks.

The locking bar 42 as such is adapted to lock a pair of opposing planks 10 together at the transition joint formed by a pair of opposing connector elements 12 in a pair of opposed planks 10 in the manner shown particularly in FIGS. 2, 4 and 4A. This same transition joint formed by opposed elements 12 on opposed planks 10 is advantageously sealed against water penetration by means of an inflatable tube element 22 disposed partially within each of the opposed grooves 20 of the opposed elements 12.

Tube 22 effectively bridges and closes the slight gap which exists upon connection of a pair of opposed elements 12. A slight gap will usually exist since the interlocking connector elements 12 making up this type of transition joint are not in fully abutting relationship. The tube 22 is inflated by suitable means to be discussed more fully hereinafter and upon inflation will advantageously act as connector element wedging means in that during its inflation it will tend to force the elements 12 apart and at the same time cause locking bar 42 to more firmly engage these same elements 12.

One system of plank installation will now be discussed, reference being made particularly to FIGS. 1, 2, 4A, 6A and 7. For convenient reference and discussion purposes, the plank joints made up of elements 12 will be referred to as transition joints X and the plank joints made up of cooperating male and female connectors will be referred to as compression joints Y. As indicated in FIG. 6A, the plank installation of this figure is initiated by first laying a line A of planks edge to edge and crosswise of the normal aircraft flight path. As the planks of line A are successively laid crosswise of the flight path, a series of compression joints Y are formed by the male connectors 16 on one plank being rolled into position into the mouth or enlarged groove 26 of the female connector 17 on a previously emplaced plank 10 until a full line A of planks 10 has been emplaced. During this installation of successive planks in row A, it is to be noted that the marginal edges of each of the planks 10 in line or row A forming transition joints X are substantially fully aligned with each other across the entire length of the planks in row A and in effect form a continuous hinge line.

For ease of assembly in laying individual planks 10 in a given row, the sealing strip or plug 34 should first be inserted in the opening 33' of the male connector 16 of the plank. The length of a sealing plug 34 is such that the smaller or main body portion thereof fits snugly in the opening 33' of connector 16 for the entire length thereof and with the enlarged head portions 37 overhanging the ends of the connector 16. The part of strip 34 that protrudes from opening 33' of the male connector 16 partially fills the opening 26 of the cooperating female connector 17 and is somewhat compressed against the back wall 26' of opening 26 as the male connector 16 is rolled into the female connector 17 or vice versa.

Upon completion of a row A of planks, a second row of planks B is installed side by side and in abutting relationship with the planks 10 in row A but with the compression joints Y formed by the male and female connectors 16 and 17 of the planks in row B being offset relative to similar compression joints Y in row A. Thus in the final assembly of planks the compression joints Y in one row will be staggered or offset relative to the compression joints Y in the next or adjacent row. The several landing mat installation systems proposed herein are such that preferably only three panels or planks will meet at a common joint. This in turn advantageously minimizes the overall plank sealing problems.

As the planks 10 in row B are emplaced, the opposed plank elements 12 of the planks in each of the two rows A and B will be placed in substantially abutting relationship such that the cavity or groove 18 in one connector element 12 will form a continuation of groove 18 in other directly opposed elements 12 of other planks and the arcuate recess 20 in one element 12 will form a continuation of the same recess 20 in the other opposing elements 12.

Installing the planks 10 in row A and in order to obtain the offset of elements making up compression joints Y as noted above, the A row starter plank 10 should be ordinarily foreshortened or be of a shorter length crosswise of the airfield than normal as indicated in FIG. 6A. This will also be true with respect to the starting planks in alternate plank rows C, E, G, etc. of FIG. 6A.

Figures 7, 7A, 8:
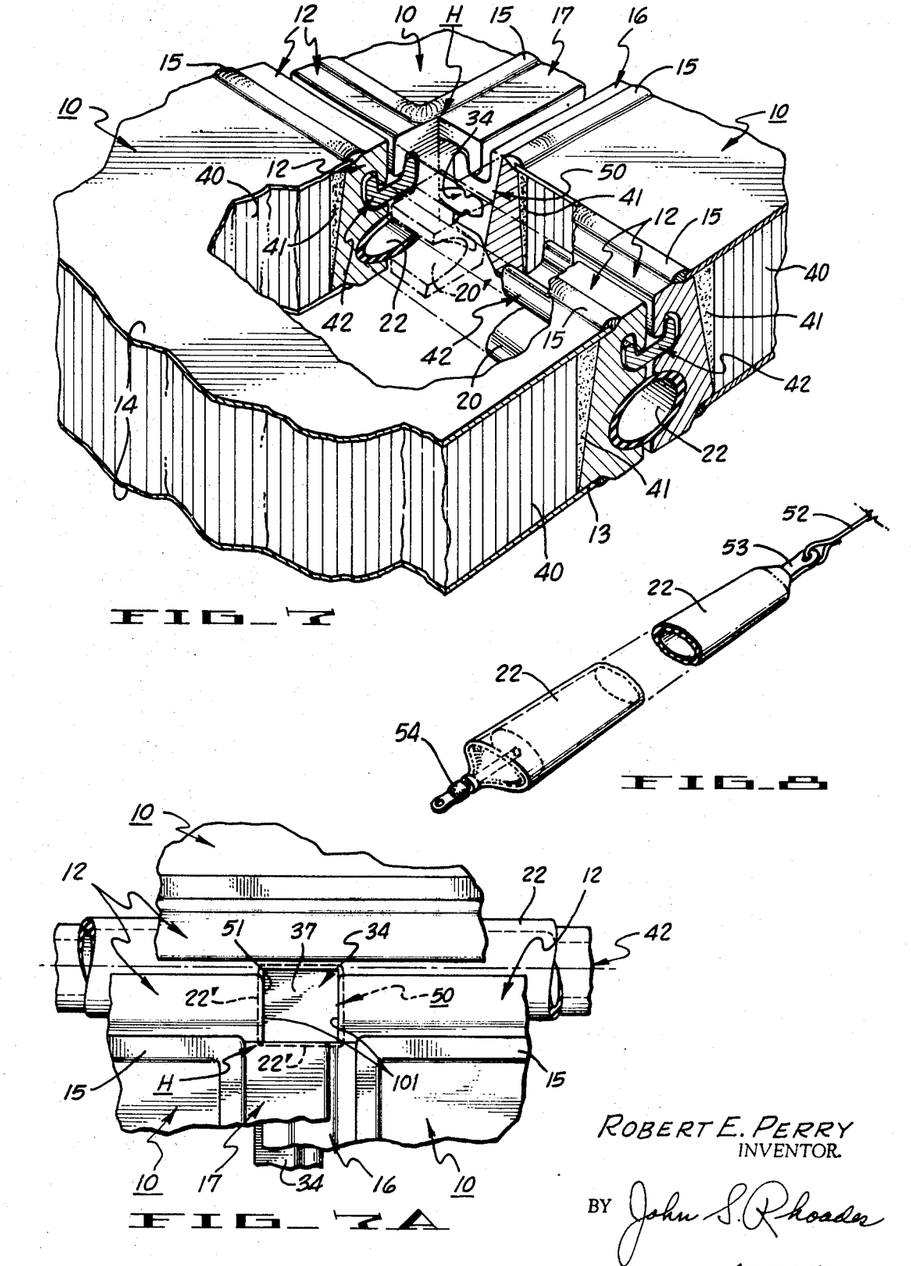
FIG. 7 is a broken away partial top perspective view of the three cornered joint structure shown within the circumscribed area 7 of FIG. 6A.
FIG. 7A is a fragmentary or partial bottom plan view of the joint structure shown in FIG. 7.
FIG. 8 is a broken foreshortened perspective view of an inflatable tube device, that can be used in practicing the instant invention.

As the planks of row B are emplaced and as indicated particularly in FIGS. 7 and 7A, the overhanging heads or enlargements 37 of the sealing strips 34 in joints Y of rows A and B will offer no serious interference to the laying of the planks in row B because of the manner in which the connector sections 12, 16 and 17 are welded or otherwise secured to each other in the areas H. The joinder of connectors 12, 16 and 17 in the corner areas H is such that the corners of these various members are not fully overlapped at their points of intersection and in effect provide, as indicated in FIGS. 7 and 7A, triangulated cutaway areas 50 at these points of intersection. Thus, when two planks 10 are arranged side by side as indicated in FIGS. 7 and 7A, and connected to a further plank 10, a square type pocket 51 is formed for receiving a head 37 of the strip 34.

The head portions 37 since they in effect form a continuation of an element 12 in addition to a continuation of sealing strip 34 contain an arcuate groove 20'. The dimensions of a groove 20' approximate those of the grooves 20 in connector elements 12. In an advantageous embodiment of the invention, since the two sides and back face 22' of this head 37 are cut at similar angles to the abutting free ends of the various elements 12, 16 and 17 in the areas H, a substantially full abutting engagement can be effected between elements 12, 16 and 17 and the head 37 of the sealing strip at the three-way joints of FIGS. 7 and 7A. In other words, the terminal or free ends of the connector elements 12, 16 and 17 are all cut at a slight angle so as to wedgingly receive a head 37 of a connector strip 34 at the various common three-way joints between three planks 10 illustrated in FIGS. 7 and 7A.

The integrity of the matting seal at the three-way joint of FIGS. 7 and 7A is further enhanced through expansion of the tube 22 in this area within the groove 20' of head 37. As expansion of the tube 22 occurs within a groove 20', and grooves 20 of elements 12 making up a given transition joint X all of the various plank elements in the area of this three-way joint will be effectively sealed together. It is to be understood of course that the planks of row B would be locked together at the various compression joints Y therein in the same fashion as the planks in row A.

After emplacement of two full rows A and B of planks 10 has reached the stage discussed above and locking bars 42 emplaced as noted below, the step is now taken to fully interlock and seal the planks of rows A and B together. This step involves inflating a sealing tube 22. A preferred embodiment of the invention contemplates that the sealing tube 22 be first installed for the entire length of the substantially continuous transition joint X made up of the successive and individual joints X made up of the planks in rows A and B and for the full width of the landing mat installation.

Various arrangements can be used for installing this tube 22. Firstly, tube 22, which is made in selected lengths that generally correspond to the overall width of a given landing mat installation, could be installed progressively in the mating openings 20 of the various planks 10 of rows A and B as the planks in row B are progressively laid. Alternately, all of the planks 10 of row B could be laid in place. After they are laid a wire rope 52 (see FIG. 8) hooked to the tapered apertured plug 53 that closes off the one end of tubing 22 and which rope has been previously disposed in all of the openings 20 of the elements 12 of the planks 10 in row A could be progressively pulled or fished through the final overall elliptical recesses formed by all of the opposed mating openings 20 in the contiguous elements 12 of the planks 10 of rows A and B by block and tackle means connected to wire rope 52 in a well-known manner. As the rope 52 is pulled along as noted above it will automatically pull the tubing through aligned openings 20 and 20'. Since the tubing 22 is in a deflated condition at this time, no serious problem will be encountered in pulling the tubing 22 through the openings 20 formed by the elements 12 or openings 20' in heads 37 of sealing strips 34. As indicated in FIG. 8, the opposing end of tubing 22 can be provided with a suitable valve device 54 similar to that used in pneumatic tires and sealed to the said opposing tubing end for use in inflating and deflating the tubing 22 at the desired times. The cap for value device 54 can also have an aperture for receiving a wire rope 52.

As noted above, the final locking of the elements 12 of the planks 10 in the continuous transition joint X between rows A and B takes place upon inflating tube 22. Prior to this step, however, locking bars 42 are first emplaced. Although these locking bars 42 can be of any length, they usually will be of a length generally corresponding to or slightly larger than that of a connector element 12 and they are preferably installed as the planks of row B are successively installed. Because of the rounded or arcuate configuration of the surfaces of lips 19 in elements 12 and the tongues 43 of the locking bars 42, these locking bars 42 can be advantageously at least partially rolled into or out of position, all of which facilitates installation and dismantlement of a portion of or the entire landing mat field.

One preferred arrangement for installation of these locking bars 42 is best illustrated in FIGS. 4 and 4A. It should be noted in the case of the fully extruded planks 10' of FIG. 4A wherein prime reference numerals are used to indicate parts similar to the plank parts of the other figures of the drawings, that the connector elements (not shown) and corresponding to connector elements 16 and 17 of the planks of the other figures of the drawings would be welded or otherwise secured to the various opposed ends of planks 14' in the same general manner, for example, as shown in U.S. Pat. 3,301,147. In addition, although installation of the locking bars 42' will be described with reference to fully extruded planks, the same system of locking bar installation can be used for the cored planks 10.

Thus, as planks 10' are progressively laid in row B and starting, for example, from the right in FIG. 4A, a bar 42' is rolled into the opening 18' of the partially exposed edge portion of the left hand plank 10' shown in FIG. 4A and into the opening 18' of element 12' thereof as well as into opening 18' of the next left hand plank 10' (not shown) of row A until the bar 42' is lodged partly or for say half of its length in the partially exposed opening 18' of the plank 10' of row A shown in FIG. 4A and for the other half of its length in the fully exposed opening of the adjacent left hand plank 10' in row A (not shown). After being rolled into the grooves 18' of adjacent planks 10' in row A the bar is slid or shifted linearly or edgewise to the right as viewed in FIG. 4A until, as illustrated in FIG. 4A, the terminal ends 100 thereof are generally substantially vertically aligned with the free terminal edges of the connector element 12 of the plank 10' of row A shown in FIG. 4A. The bar 42', when fully emplaced, at the same time will bridge the transition joint Y (not shown) and formed between the plank 10' of row B that is shown in FIG. 4A and the next plank 10' of row B (not shown) and to be laid. As the next plank 10' (not shown) of row B is laid and continuing toward the left in FIG. 4A, the lip 19' defining slot 18' thereof can be rolled at least partially about the previously emplaced locking bar 42'. This same procedure is continued until a full line of locking bars 42' has been installed for the full length of the transition joint X that continues across the width of the field.

Thus, applying this installation scheme to the matting disclosed in FIG. 6A, it will be observed that when the first three panels a, b and c in row A are laid and the first panel d in row B is emplaced, the following will occur. Assuming the installation of planks 10 proceeds from right to left in this FIG. 6A of the drawings, the first locking bar 42 to be emplaced would be rolled into groove 18 partly in elements 12 of planks b and c of row A. The locking bar is then slid lengthwise or to the right as viewed in FIG. 6A until its one end 100 is aligned with the right hand edges 101 of elements 12 in panels a and d while its other end is located in the area of the common three-way joint J between panels e, b and d. A similar procedure is used as the next panels e and f of row B are emplaced, etc. In other words (see FIG. 4A), the locking bar 42 can be installed by first rolling in the bar in an opening 18 in an exposed marginal edge of several planks and then sliding it lengthwise into the overall closed opening formed by a pair of adjoined elements 12 in different rows. The aforesaid procedure of plank installation can be used for the next rows C, D, E, F, G, etc. of planks 10 until the entire landing mat installation has been completed.

The above described scheme of mat installation illustrated in FIG. 6A advantageously provides for easy repair of a mat section or plank damaged by mortar fire or bombing in that to repair a given plank only the planks in the row containing the damaged plank have to be removed. For example, let us assume that in the case of the mat system of FIG. 6A the damaged plank is the plank W which is the third plank in from the right hand side of the runway in plank row E. In order to gain access to this plank W, the transition joint tubes 22 between plank rows D, E and F would first have to be deflated.

After deflation of these tubes, the offsized first plank in row E at the extreme right hand of row E in the runway is first removed by withdrawing by means of a suitable tool the locking bars 42 from each side thereof that hold this first plank in place and then pivoting or rolling this first plank upwardly and to the left as viewed in FIG. 6A whereby it is fully released from its associated planks in rows D, E and F as the male and female connectors 16 and 17 in the first compression joint Y' become disengaged.

As noted above, the locking bars 42 can be made to correspond in length substantially to that of the individual connector elements 12 on a plank 10 or to be slightly longer. In such instances, as well as in instances where the bars are as long as the full panel sides with which they are associated, i.e. they extend beyond their associated connectors 12 to the point that aligned bars 42 abut each other, they will not interfere with deflation of their associated tube 22. When a tube 22 is deflated, all of the associated locking bars 42 will be loosened sufficiently in openings 18 whereby they can be grasped by a suitable tool so that they can be shifted or slid endwise and removed. If desired, the ends of the locking bars can be provided with a threaded opening 102 (see FIG. 4A) into which an externally threaded tool could be inserted for the purpose of dislodging the bars 42 when desired.

In any event removal of the first plank 10 in row E now exposes the second plank W' from the right hand edge. This second plank W' is made ready for removal by removing the two locking bars 42 therefor in the manner noted above and then pivoting plank W' upwardly to effect a disengagement of the male and female connectors 16 and 17 between plank W' and damaged plank W and an exposure of the locking bars 42 on opposing sides of plank W. Removal of these latter locking bars in the manner aforedescribed permits upward pivoting and removal, repair and replacement of this plank W. All of this can take place by deflating tubes 22 between plank rows D, E and F and by pulling a deflated tube 22 away from the areas of plank removal after attachment or hooking of a wire rope 52 to both ends thereof.

When a new or the repaired third plank W of row E is to be laid in place, the two locking bars 42 therefor are first rolled in as noted above and slid lengthwise in overall transition joints X between plank rows D–E and E–F to lock them in place after the engagement of female and male connectors 16 and 17 for the next undisturbed mat W" and mat W has been reestablished and repaired or replaced mat W has been pivoted downwardly to its position of rest. This same procedure is followed with respect to the plank W' as well as the first plank in from the right in row E. After replacement of the various planks that have been removed, the deflated tubes 22 between rows D-E and E-F are pulled back into the areas of plank replacement by means of the wire ropes attached to one of the ends of the tubing. After full replacement, the tubes are reinflated.

Figure 6:
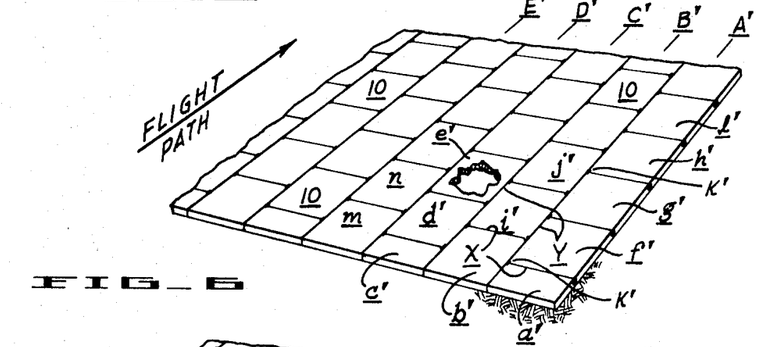
FIG. 6 is an overall schematic view of a typical landing mat installation in which the modular planks of the instant invention can be employed.
Figure 6A:
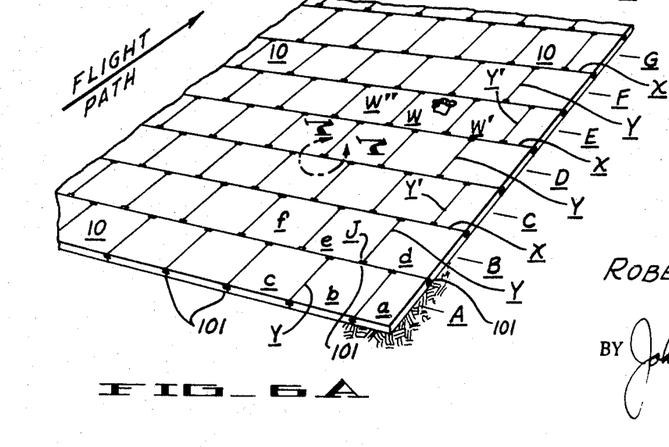
FIG. 6A is a view similar to FIG. 6 of an alternate landing mat installation wherein transition joints between the planks are arranged generally transverse to the normal landing patterns and in substantially parallel relationship to each other.

In situations where the mat installation system of FIG. 6 is used, the installation and removal steps of the individual mats are somewhat different from those of FIG. 6A because all of the transition joints X are staggered or offset relative to each other while the compression joints Y generally parallel each other. The transition joints X, however, are still preferably located at an angle to the normal flight path. The initial installation of the matting shown in FIGS. 6 and 9 can proceed by first installing a foreshortened right hand corner panel a' with the connector elements 12 thereof being located generally transverse to the traffic pattern in transition joints X and male and female connectors 16 and 17 being arranged generally parallel to the traffic pattern in compression joints Y.

Connector 17 of plank b' is then rolled into place and into connector 16 of plank a' which contains sealing strip 34 at a joint Y. Then foreshortened plank c' and regular plank d' are rolled into place and connected to plank b' at joints Y in chevron fashion. The remaining planks 10 can then be installed in similar stepped fashion. In effect, the plank row arrangement of FIG. 6 is one wherein the individual compression joints are aligned to form substantially continuous and parallel joints Y and plank rows A', B', C', etc. In the system of FIG. 6 and as indicated particularly in FIG. 9, since the connector 17 instead of a connector 12 bridges the three-way joint formed at the intersection of any three panels, the heads 37 of the sealing strips 34 must be slightly modified so as to be accommodated within the spacing in such three-way joints. This modification involves cutting off of the bottom prong or finger 23 of each head element 37 in the manner shown in dotted lines in FIGS. 3 and 1 whereby the bottoms of the heads 37 can clear shelf portion 28 on connectors 17. The height of the heads 37 are not such as to interfere with the rolling of a connector 17 into connector 16. These heads 37 will as indicated schematically in FIG. 9, substantially fill the triangulated cutaways 50 between connectors 12 and 16 in each of the panels being joined.

The locking bars 42 can be inserted progressively as soon as any two opposing connectors 12 are brought together in the fashion previously described. Thus, for example, when planks or panels c' and d' are joined together, the locking bar 42, therefore, can be slid into place in the opposed openings 18 of planks c' and d' prior to connecting these planks to other planks m and n, etc. through the medium of the connector elements 16 and 17 thereof. As soon as planks a' and f' have been adjoined, the locking bar 42 therefor can be installed, etc.

Figure 9:
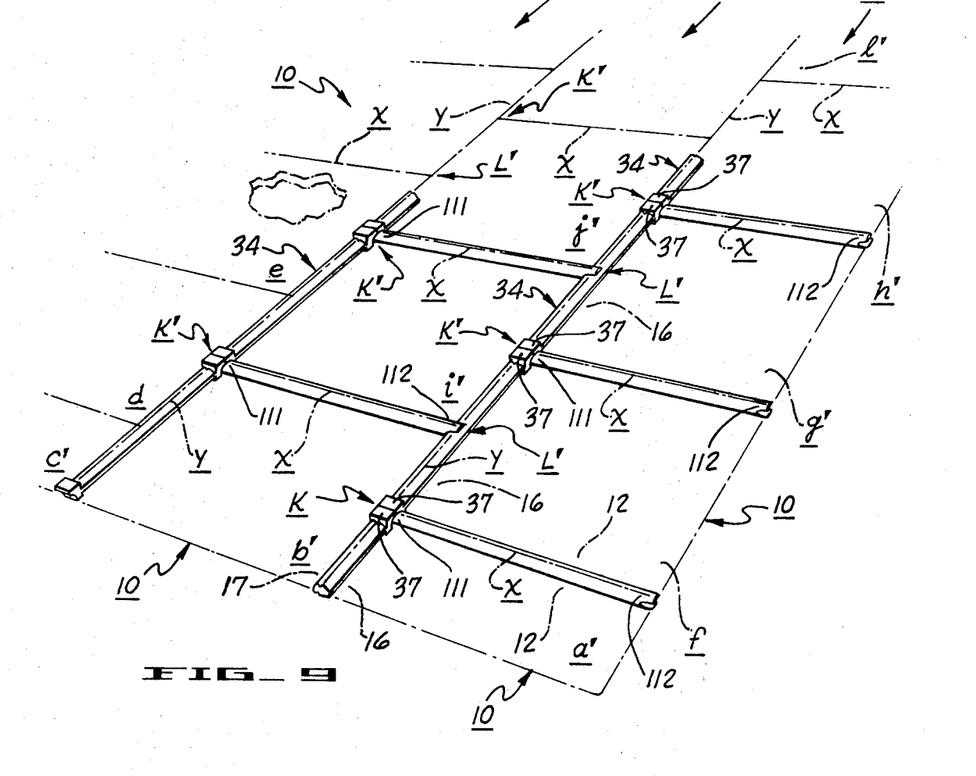
FIG. 9 is an enlarged diagrammatic view of the plank sealing system of FIG. 6.
Figure 10:
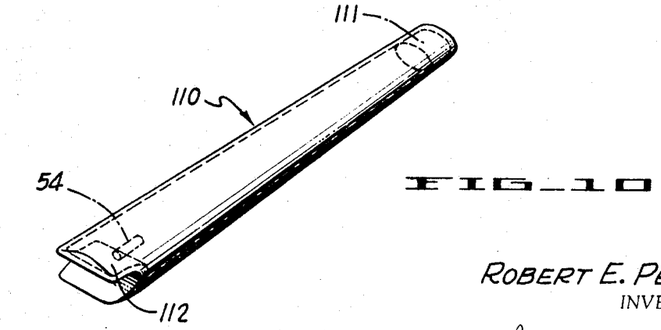
FIG. 10 is a perspective of a modified inflatable tube used in the plank system of FIG. 6.

In the mat installation of FIGS. 6 and 9, each inflatable tube 22 will be of a relatively short length and can be installed as two plank edges 12 are brought together and prior to installation of a locking bar 42 therebetween. A tube 22 is then inflated just after its associated locking bar 42 is emplaced. As indicated particularly in FIGS. 9 and 10 and because of the offsetting or chevron arrangement of the panels 10, one sealed off end such as end 111 of the short sealing and inflatable tube 110 will always be located in a joint K' containing the modified sealing strips 34. The other forked end 112 advantageously fits about the intermediate section or waist 35 of a sealing strip 34 in the manner generally shown in FIG. 9 at a joint L' and in general abutting relationship with respect to tongue elements 31 and 32 of a connector 16. The tube can also be provided with a suitable inflating device 54 as in the case of tube 22 in FIG. 8.

Repair of a damaged panel in the matting of FIG. 6 is also a relatively simple matter as compared to prior art practices. For example, let us assume that the third panel e' in from the bottom of FIG. 6 in row C' is damaged and has to be removed for repair or replacement purposes. A triangular plank removal scheme must be employed. The removal of plank e' is initiated by removing planks f' g' and h' in row A' and planks i' and j' in row B'. Each of these planks to be removed is effected first by deflating the individual inflatable tube section 22 between adjacent planks in joints X and then removing the locking bars 42 as aforedescribed in the joints between panels a'–f', f'–g', g'–h', and h'–l'.

After the deflation and removal of the locking bars 42 and tubes 22, the planks f', g' and h' are pivoted upwardly in compression joint areas Y. Removal of planks f', g' and h' will expose planks i' and j'. After the tubes 22 for planks i' and j' have been deflated and their associated locking bars 42 removed, planks i' and j' can be pivoted upwardly in the areas of their compression joints Y and removed thereby fully exposing plank e'. Removal of plank e' is effected in the same fashion as planks f' through j'. Upon replacement of the damaged plank e' after its repair or substitution of another plank, plank e' and all the removed planks are relaid by a reverse connecting process in that the male and female connectors 16 and 17 of opposed planks are first brought into engagement after which the associated locking bars 42 and tubes 22 are then installed in the various transition joints X as soon as each such joint is formed by a pair of opposed panels or planks 10.

The inflation of the various tubes 22 advantageously acts to lock the various panels together in addition to serving as sealing elements. The particular plank interlocking and joining arrangement proposed herein permits the individual mats to adjust themselves to slight irregularities in the contour of the land at the mat installation site without becoming disengaged and even though this site would have been usually leveled by the usual grading devices beforehand.

By virtue of the aforesaid arrangement, a full parametric sealing of the individual planks is effected in a relatively simple fashion. The inflatable and compression sealing system proposed tends to keep all of the planks in firm contact with each other and effectively prevents the penetration of water into the subsoil below the mat system, particularly at the common joint between any three planks where water penetration and soil erosion have been pronounced in prior mat systems of the type described.

Although not discussed or described, it is to be understood that an appropriate overall tie down arrangement such as that shown in Pat. 3,301,147 can be used to anchor the final overall matting to the subsoil.

Advantageous embodiments of the invention have been shown and described. It is obvious that various changes and modifications may be made therein without departing from the spirit and scope thereof as defined in the appended claims, wherein what is claimed is:

1. In a modular plank system the combination of a plurality of removably interlocked planks, the opposing marginal edges of a pair of opposing interlockable planks each being provided with at least one inwardly and upwardly directed tongue receiving groove and the major surface areas of said groove being or arcuate configuration, a load transferable locking bar for locking said planks together, said bar being provided with a plurality of groove matching arcuate tongues each of which is receivable in a separate one of said opposing tongue receiving grooves of said pair of opposing planks and one of said tongues on said bar being rollable into position in one of said tongue receiving grooves and an expandable common sealing element disposed between said pair of interlockable planks, said sealing element being initially disposed in opposed recesses in said interlockable planks in a collapsed condition.

2. A system as set forth in claim 1, wherein said pair of planks comprise a selected portion of a landing mat installation and said opposing marginal plank edges are arranged at an angle to the normal landing path formed by said mat installation.

3. In a modular plank system the combination of a plurality of removably interlocked planks, the opposing marginal edges of a pair of opposing interlockable planks each being provided with at least one inwardly and upwardly directed tongue receiving groove and the major surface areas of said groove being of arcuate configuration, a load transferable locking bar for locking said planks together, said bar being provided with a plurality of groove matching arcuate tongues each of which is receivable in a separate one of said opposing tongue receiving grooves of said pair of opposing planks and one of said tongues on said bar being rollable into position in one of said tongue receiving grooves and the said opposing marginal edges of said pair of planks being further provided with a second series of opposing grooves and a common sealing element disposed in said opposing grooves.

4. The system as set forth in claim 3 wherein said sealing element comprises an inflatable tube of resilient material.

5. In a sealed modular plank system the combination of a plurality of removably interlocked planks, the opposing marginal edges of a pair of opposed planks being provided with opposed sealant element receiving recesses, an inflatable sealing element of resilient material disposed in said recesses, a further series of opposed recesses in the said opposing marginal edges of said pair of planks and a plank interlocking means removably inserted in said last mentioned recesses.

6. A system as set forth in claim 5, wherein said inflatable sealing element comprises a single inflatable tube element insertable and expandable in each of first mentioned recesses.

7. A system as set forth in claim 5, wherein said pair of planks comprise part of a landing mat installation and said opposing marginal plank edges are arranged at an angle to the normal landing path formed by said mat installation.

8. A system as set forth in claim 5, including a sealing means disposable in the joint between a marginal edge of one of the planks that is disposed adjacent to the first mentioned plank edge and the marginal edge of a third plank.

9. In a modular plank system the combination of a plurality of removably interlocked planks, means sealably interlocking the opposing marginal edges of a pair of opposing interlockable planks to each other, said means comprising a channel-like opening on the marginal edge of one of the planks defined in part by a shelf portion and an opposed turned in finger portion and a bifurcated member on said other plank provided with a support portion slidably disposed on the shelf of said first plank and a finger portion interengageable with the turned in finger portion on said first plank and the opening of said bifurcated member having a strip of resilient compressible material fixedly disposed therein and projecting from the opening of said bifurcated member to engage a wall that in part forms a channel like opening in said one plank edge and said strip of resilient compressible material also having an enlarged head portion which is receivable within a pocket like opening formed in a common joint between said pair of opposing interlockable planks and a third plank.

10. In a system as set forth in claim 9, wherein the opening of the bifurcated member is provided with at least one strip anchoring tooth element.

11. In a modular plank system for use in a landing mat installation the combination of a plurality of removably interlocked planks, certain opposing marginal edges of a pair of opposing interlockable planks each being provided with at least one inwardly and upwardly directed tongue receiving groove and the major surface areas of said groove being of generally arcuate configuration, a load transferring locking bar for locking said pair of planks together and provided with a plurality of groove matching arcuate tongues each of which is receivable in a separate one of said opposing tongue receiving grooves of said pair of opposing planks with one of said tongues being initially rollable into position in one of said tongue receiving grooves, another marginal edge of one of said planks and the marginal edge of a further plank also being removably locked together, means sealably interlocking said last mentioned marginal plank edges together, said means comprising a channel-like opening in one of said last mentioned marginal plank edges which is defined in part by a shelf portion and an opposing turned in finger portion, a bifurcated tongue member on the other of said last mentioned marginal plank edges, said bifurcated tongue member having one tongue portion slidably disposed on the shelf portion of said one plank and a finger portion interengageable with the inturned finger portion on said one plank, the opening of said bifurcated tongue member being provided with at least one tooth element and a strip of resilient compressible material disposed within and projecting from the opening of said bifurcated tongue member with the tooth element anchoring said strip in the said opening.

12. A load supporting plank useable in a modular landing mat plank system with planks of similar configuration said plank having a male connector means on one marginal edge of the plank and a complementary female connector means on the opposing marginal edge thereof, said female connector means comprising a channel like opening defined in part by a shelf portion and an opposing turned in finger portion, said male connector means including a bifurcated tongue member provided with a tongue portion slidably disposable on the shelf of the female connector means of an adjacently arranged and similarly configured plank and another tongue portion interengageable with the tongue portion of the female connector means on said adjacently arranged and similarly configured plank and a sealing strip of resilient compressible material disposed within and projecting from the opening of said bifurcated member said sealing strip also being provided with an enlarged head at one end thereof that projects from the opening of the bifurcated member and is insertable in a common three-way joint formed between a plurality of adjacent planks upon the assembly thereof.

13. A plank as set forth in claim 12 wherein the said sealing strip head is provided with angularly disposed portions and other opposing marginal edges of the plank are provided with spaced grooves for receiving a locking bar and sealing member.

14. In a sealed modular plank system the combination of a plurality of removably interlocked planks, the opposing marginal edges of a pair of opposed planks being provided with opposed sealant element receiving recesses, a common expandable tube-like sealing element disposed in said opposed recesses, a further series of opposed recesses in said opposing marginal edges of said planks and a plank interlocking means removably inserted in said last mentioned recesses.

15. A system as set forth in claim 14 including a further sealing element disposed in the joint between a further marginal edge of one of the planks of said pair of planks and the marginal edge of a third plank said second mentioned sealing element also being disposed at an angle to said expandable tube-like sealing element.

16. In a sealed modular landing mat system and the like a substantially fully sealed three-way joint structure and pocket formed at the intersection of a pair of opposed panels and a third panel, the opposing marginal edges of said pair of panels each being provided with opposing recesses, a common expandable tube-like sealing element disposed partially in each of said opposing recesses and another sealing element of resilient compressible material carried by said third panel, said second mentioned sealing element being in sealing engagement with the expandable tube-like sealing element in the area of said three-way joint structure and said second mentioned sealing element also being disposed at an angle to said expandable tube-like sealing element.

17. The joint structure of claim 16 wherein the second mentioned sealing strip is provided with an enlarged head portion which is insertable in the said joint structure and is in sealing engagement with the tube-like sealing element.

18. An elongated sealing element of resilient compressible material for use in a modular plank system, said sealing element having at least one enlarged head at one end thereof, said head being receivable within and sealing the pocket formed at a common joint formed by certain marginal edges of a plurality of planks in a modular plank system and the sealing element head having angularly disposed side portions whereby said sealing element head will fit snugly within the said pocket.

References Cited

UNITED STATES PATENTS

| | | | |
|---|---|---|---|
| 2,753,018 | 7/1956 | Curell | 52—588X |
| 2,786,556 | 3/1957 | Constance | 52—588 |
| 2,848,762 | 8/1958 | Peterson | 52—403X |
| 2,960,195 | 11/1960 | Toth | 52—403 |
| 3,176,807 | 4/1965 | Pavlecka | 52—588X |
| 3,242,621 | 3/1966 | Willson | 52—403X |
| 3,348,459 | 10/1967 | Harvey | 94—13 |
| 3,368,315 | 2/1968 | Thurnau | 52—593X |
| 3,368,463 | 2/1968 | Jones | 94—18 |
| 3,385,183 | 5/1968 | Kortz | 94—13 |
| 3,435,574 | 4/1969 | Hallock | 94—18X |

FOREIGN PATENTS

| | | | |
|---|---|---|---|
| 635,293 | 3/1962 | Italy | 94—18 |

JACOB L. NACKENOFF, Primary Examiner

U.S. Cl. X.R.

52—588